US008780358B2

(12) United States Patent
Stone et al.

(10) Patent No.: US 8,780,358 B2
(45) Date of Patent: Jul. 15, 2014

(54) INSPECTION APPARATUS, SYSTEM, AND METHOD

(75) Inventors: Robert L. Stone, Perry Hall, MD (US); Mohammed T. Islam, Ellicott City, MD (US); Patrick L. Mohney, Fort Mitchell, KY (US); Steven T. Smith, Mason, OH (US)

(73) Assignee: Sick, Inc., Minneapolis, MN (US)

( * ) Notice: Subject to any disclaimer, the term of this patent is extended or adjusted under 35 U.S.C. 154(b) by 61 days.

(21) Appl. No.: 13/490,578

(22) Filed: Jun. 7, 2012

(65) Prior Publication Data

US 2012/0314222 A1    Dec. 13, 2012

Related U.S. Application Data

(60) Provisional application No. 61/494,116, filed on Jun. 7, 2011, provisional application No. 61/622,704, filed on Apr. 11, 2012.

(51) Int. Cl.
*G01B 11/30* (2006.01)
*G01B 11/24* (2006.01)
*G01N 21/00* (2006.01)

(52) U.S. Cl.
USPC ............... 356/601; 356/237.3; 356/237.6

(58) Field of Classification Search
None
See application file for complete search history.

(56) References Cited

U.S. PATENT DOCUMENTS

| | | | |
|---|---|---|---|
| 5,469,262 A * | 11/1995 | Keen et al. ............. | 356/639 |
| 2002/0034279 A1 * | 3/2002 | Hirano et al. .......... | 378/114 |
| 2010/0208039 A1 * | 8/2010 | Stettner ................... | 348/49 |
| 2010/0292968 A1 * | 11/2010 | Gielis ...................... | 703/2 |

* cited by examiner

*Primary Examiner* — Gregory J Toatley
*Assistant Examiner* — Hina F Ayub
(74) *Attorney, Agent, or Firm* — Miles & Stockbridge, P.C.

(57) ABSTRACT

Systems, apparatuses, methods, and computer program products for inspection of objects or items in a conveyance system. Presence (or absence) of an object/item or objects/items is detected sensed and also one or more characteristics of the object/item can be determined based image detection of characteristics of one or more laser lines projected on a conveyance surface of the conveyance system.

8 Claims, 11 Drawing Sheets

INSPECTION APPARATUS, SYSTEM, AND METHOD

CROSS-REFERENCE TO RELATED APPLICATIONS

The present application claims the benefit of U.S. Provisional Application No. 61/494,116 filed Jun. 7, 2011 and U.S. Provisional Application No. 61/622,704 filed Apr. 11, 2012, both of which are hereby incorporated herein by reference in their entireties.

FIELD

The disclosed subject matter involves inspection of a conveyance system in order to detect or determine presence of an object or item in the conveyance system. The disclosed subject matter also involves inspection of a conveyance system to determine a characteristic of a detected object or item in a conveyance system.

SUMMARY

The Summary describes and identifies features of some embodiments. It is presented as a convenient summary of some embodiments, but not all. Further the Summary does not necessarily identify critical or essential features of the embodiments, inventions, or claims.

Included among embodiments described herein is a method comprising: automatically and electronically inspecting an upper surface of a conveyor; and automatically and electronically determining a height of an object detected by said inspecting. The determining can be based on a characteristic of an angled laser beam detected, in said inspecting step, by an image detecting apparatus positioned directly above and centered above the conveyor with respect to a direction perpendicular to a conveyance path of the conveyor.

Embodiments also include a method comprising: providing an image detecting apparatus oriented so as to be directed directly vertically downward toward a path of conveyance for a tray and a laser source oriented at an angle to project a laser so as to follow a contour of an upper face of the tray; automatically and electronically inspecting the upper surface of the tray for presence of an object using the image detecting apparatus in cooperation with the laser source; and determining whether or not an object is present on the upper face of the tray based on said inspecting of the upper surface of the tray. Optionally, the method can comprise determining a height of a detected object present on the upper face of the tray. Optionally, the method can comprise determining a three-dimensional representation of the detected object based on the determined height and outputting a three-dimensional image of the object.

In embodiments, a method comprises: providing an image detecting apparatus oriented so as to be directed directly vertically downward toward a path of conveyance for a conveyor and a laser source to project a laser so as to follow a contour of an upper face of the conveyor; automatically and electronically inspecting a zone of the upper surface of the conveyor; automatically and electronically detecting presence of an item located fully or partially in the zone; and automatically and electronically determining a position of the item in relation to the zone. The determining can be based on a characteristic of an angled laser beam projected from the laser source detected, in said inspecting step, by the image detecting apparatus positioned directly above and centered above the conveyor with respect to a direction perpendicular to the conveyance path of the conveyor. Optionally, the zone represents substantially the entire upper surface of the conveyor.

Embodiments also can include a nontransitory computer readable storage medium having stored thereon software instructions that, when executed by a processor, cause the processor to perform operations comprising: providing signals to cause inspection by a camera of a curvilinear laser beam path on or adjacent an upper surface of a conveyor for one or more breaks in the laser path, the camera being positioned directly above and centered above the upper surface of the conveyor with respect to a direction perpendicular to a conveyance path of the conveyor; and determining a physical characteristic or a position of an object, whose presence was detected during the inspection by the camera, based on signals received from the camera regarding one or more breaks in the laser path. Optionally, the physical characteristic or the position of the object includes a height of the object, a geometry of the object, a zone on the conveyor associated with the position of the object, and a length of the object, respectively.

Included among embodiments described herein is a system for detecting a characteristic of an object riding on a portion of an upper face of a conveyor, comprising: an image detecting apparatus positioned directly over a path of conveyance for the conveyor, said image detecting apparatus being oriented so as to be directed directly vertically downward; a laser source oriented to output laser light at an angle such that the laser light is projected so as to follow a contour of the upper face of the conveyor; and a controller electrically connected to said image detecting apparatus and said laser source. The image detecting apparatus can be operative to sense a characteristic of the output laser light to detect presence of the object riding on the conveyor. Optionally, the portion of the conveyor is one of a leading edge of a portion of the conveyor belt, a leading edge of the tilt tray cell, or a leading edge of the cross belt cell.

Optionally, the detected characteristic of the object can be one or more of presence of the object on the conveyor, the height of the object, a height profile of the object, a position of the object on the upper face of the conveyor. The object or item may be a piece of mail. Further, the object or item, for instance, a piece of mail, can have a height that does not extend above upper extremities of the concave upper face of the conveyor.

In one or more embodiments, the system can, based on the detected position of the object, relocate the object on the conveyor. The relocation may be to another portion on the upper face of the conveyor. Alternatively, the relocation is completely off of the upper face of the conveyor. Optionally, the upper face of the conveyor may be concave. Further, the conveyor may be one of a tilt-tray conveyor and a cross-belt conveyor.

The image detecting apparatus may be configured and operative to take multiple image captures of the object or item. Optionally, the image detecting apparatus is programmable to create different detection fields or zones. Optionally or alternatively, the image detecting apparatus is operative to detect the characteristic of the item along an entire length of the laser light scan line or to detect an item characteristic based only a portion or portions of the laser light scan line. In one or more embodiments, the image detecting apparatus is a digital camera.

Optionally, the system can comprise a triggering apparatus to turn on and off the image detecting apparatus based on detected presence or absence of a portion of the conveyor.

The characteristic of the output laser sensed by the image detecting apparatus may be one of a shift in the projected laser light, a break in the projected laser light, a timing of a shift or a break in the projected laser light, or a shift or break in the projected laser light and a timing of the shift or break in the projected laser light. Further, optionally, contrast and/or surface characteristics of the object do not prevent detection of a characteristic of an object.

Optionally, the laser source is or includes two lasers on opposite sides of the conveyor, each of the lasers being oriented to produce a projected laser line parallel or substantially parallel to the top surface of the conveyor and parallel to a direction of movement of the conveyor. Multiple lasers on each side also may be optionally employed. The system can perform displacement detection using the two laser sources. Optionally, the displacement detection may be with respect to an upper surface of the conveyor and/or can include displacement mapping by displacement mapping computer graphics technique.

Embodiments also include a system for creating a three-dimensional effect, comprising: a plurality of trays arranged in a single-file line, each said tray having a concave upper face, the concave upper face being configured to carry an item; a camera arranged directly over a fixed scan area associated with the plurality of trays in the single-file line, said camera being vertically oriented such that its lens is directed directly vertically downward toward the scan area; a diffused laser source oriented to output laser light at an angle so as to create a diagonal laser line through the scan area; a cell trigger to determine a leading edge of an item in the scan area or about to enter the scan area while being carried on one of said plurality of trays and to send signals to make operational said camera; and a controller electrically coupled to said camera, said diffused laser source, and said cell trigger. When rendered operational by said cell trigger, the camera is configured and operative to receive and sense reflected laser light and to detect any shifts in the diagonal laser line based on the received and sensed reflected laser light. The system can be operative to determine a height of the item in the scan area while being carried on said one of said plurality of trays based on shift characteristics of any detected shifts in the diagonal laser line. The controller can be operative to receive the signals from said cell trigger, to create and send pulses to the camera for a desired rate of image capture.

The system can be operative to generate a three-dimensional representation of the item based on the determined height of the item, and/or can be operative to store data corresponding to the three-dimensional representation in a computer readable storage medium or to display the three-dimensional representation via a display device. Further, optionally, the arrangement and orientation of said camera is such that no hidden areas or shadow zones are created.

Optionally, each tray is a tilt tray. Optionally or alternatively, the plurality of trays may be part of a loop sorter conveyance system. In one or more embodiments, the plurality of trays may be configured and operative to move at any speed from 1.5 m/s to 2.5 m/s. Also, each of the plurality of trays can be configured and operative to convey items of different shapes, sizes, or reflective properties.

In one or more embodiments, the system can be arranged at a position before induction of items to a conveyance system and/or at a position after unloading of items from a conveyance system. Optionally, the system may be used to detect stray items before induction and/or after unloading.

Optionally, the camera can be a digital camera, which may include a sensor array to sense the reflected laser light, the sensor array being one of a complementary metal oxide semiconductor (CMOS) sensor array or a charge-coupled device (CCD) sensor array, and the sensor array may have a pixel size sized so as to have desired resultant height resolution in both x and y directions. In one or more embodiments, the camera may be programmable so as to create different detection fields to thereby apply varying detection for different areas of scan. Optionally, the fixed scan area can be based on the contour or shape of said plurality of trays. Optionally, the system can comprise at least one other of the cameras, at least other of the diffused laser sources, and at least one other cell trigger associated with the plurality of trays of the single-file line. Further, each camera may optionally be configured and operative to take multiple image captures of the item while on one of said trays associated with the item moves into and through the fixed scan area.

In one or more embodiments, the system is operative to determine a height of the item in the scan area based geometry of one of said trays in the scan area, the geometry of said one tray being one or more of a curvature of the upper face, the surface area of upper face, the length of the upper face, the height of the upper face, the width of the upper face, and the plan view shape of the upper face. Optionally or alternatively, the system is operative to determine a height of the item for items having a minimum footprint of three inches by three inches. Optionally or alternatively the system is operative to determine a height of the item for items ½ inch or taller. Characteristics of the item can include relatively small, relatively thin, made of a color having relatively high light absorption, and made of a color with a relatively low color contrast with the tray. Further, optionally, the system does not rely upon contrast of the item with respect to the tray upon which it is conveyed to determine the height of the item.

In one or more embodiments, the item can rest on one of said trays and another item may also rest on the one tray, the item and the another item may be arranged in non-touching manner such that a portion of each item overlaps the other in a side view, and also be arranged in a non-overlapping manner from an overhead view, wherein the system can be operative to determine respective heights of the items in the scan area while the items are carried on the one tray based on shift characteristics of a detected shift in the diagonal laser line associated with the one item and another detected shift in the diagonal laser line associated with the other item. Optionally, the shift characteristics can include one or more of a length of a break or breaks in the laser line and a timing of the break or breaks. Further, the shift characteristics may include a combination of the length of break and timing thereof in order to determine heights of an item with a non-uniform height.

According to embodiments, the disclosed subject matter includes apparatuses, systems, and/or methods configured to be implement any of the systems and methods described herein. Further, embodiments also can include computer program products or non-transitory computer readable media that can perform some or all aspects or functionality of methods, circuitry, circuits, systems, or system components as set forth herein and according to embodiments of the disclosed subject matter.

BRIEF DESCRIPTION OF THE DRAWINGS

Embodiments will hereinafter be described in detail below with reference to the accompanying drawings, wherein like reference numerals represent like elements. The accompanying drawings have not necessarily been drawn to scale. Any values dimensions illustrated in the accompanying graphs and figures are for illustration purposes only and may not represent actual or preferred values or dimensions. Where applicable, some features may not be illustrated to assist in the description of underlying features.

DETAILED DESCRIPTION

Figure 1:
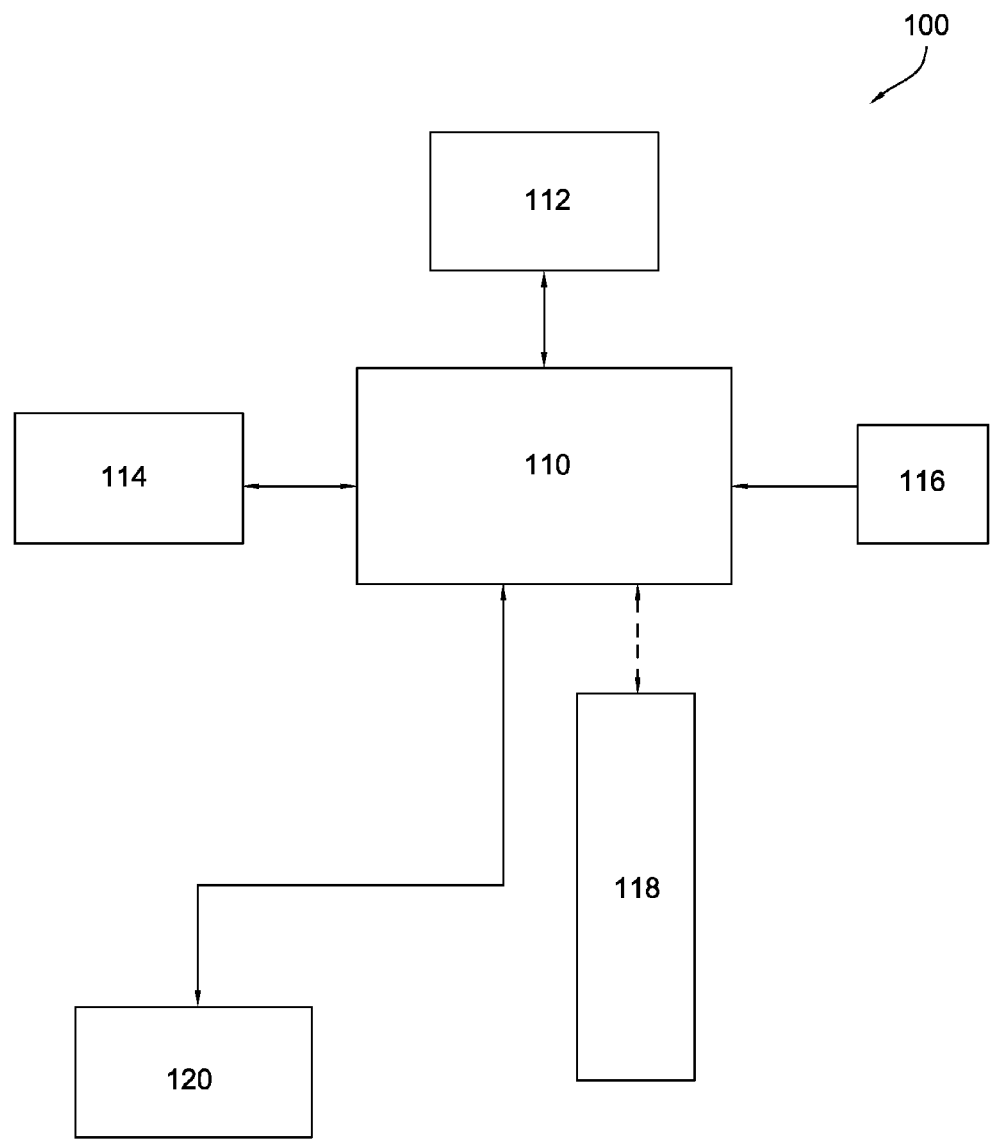
FIG. 1 a block diagram of a system according to embodiments of the disclosed subject matter.

The detailed description set forth below in connection with the appended drawings is intended as a description of various embodiments of the disclosed subject matter and is not intended to represent the only embodiments in which the disclosed subject matter may be practiced. The detailed description includes specific details for the purpose of providing a thorough understanding of the disclosed subject matter. However, it will be apparent to those skilled in the art that the disclosed subject matter may be practiced without these specific details. In some instances, well-known structures and components are shown in block diagram form in order to avoid obscuring the concepts of the disclosed subject matter.

The disclosed subject matter involves inspection of a conveyance system in order to detect or determine presence of an object or item being moved by the conveyance system. The disclosed subject matter also involves inspection of a conveyance system to determine a characteristic of a detected object or item being moved by a conveyance system.

The disclosed subject matter, as will be discussed in more detail below, can be implemented to create a representation (e.g., a two-dimensional and/or a three-dimensional representation) of a detected item or object on a conveyor using specific positioning of a two-dimensional camera, for instance, in combination with specific positioning of a laser beam or beams. An angle of the laser beam or beams can be optimized for sensitivity of height detection, max height of item, minimum gap between items, and/or configuration of a surface upon which the item or items are conveyed, for instance. The angled laser or lasers with vertical oriented camera can enable reduction or elimination of hidden areas or shadow zones based on item height.

In addition to or as an alternative, in an embodiment or embodiments, one or more lasers can be oriented such that a dispersed laser line is horizontal or substantially horizontal to a top surface of a conveyor system (e.g., a top surface of a tray). One or more lasers can be mounted on opposing sides of the top surface of the conveyor system, for instance, to produce a projected laser line or lines parallel to or substantially parallel to the top surface of the conveyor system and parallel to a direction of travel of the top surface of the conveyor system. The laser or lasers may be placed at respective heights (e.g., the same or different height) above the top surface, for instance, less than a minimum height of the object or objects to be detected. For instance, in embodiments, the laser or lasers can be set high enough to minimize false detect errors as a result of the tray blocking the laser beam or beams. An electronic image capture apparatus or devices (i.e., a vision tool), such as an imaging camera looking directly down on the try, may be used to analyze and detect characteristics of a laser beam or beams. The electronic image capture apparatus or devices may be a line analysis tool, which can implement pattern recognition, pixel counting, etc. on the image in the middle of the upper surface, for instance. When an object or objects are on the upper surface of the tray, this can create a shadow effect on the line or lines. The shadow, a result of laser occlusion, can change the line pattern and can trip the image analysis tool. Tripping of the image analysis tool can represent and be reported as an indication of an object or objects on the tray. Such additional or alternative laser/lasers arrangement can be implemented for certain shaped trays, for instance.

An item or object carried by the conveyor system can be of any suitable size or shape or can have any suitable characteristics. Additionally, the conveyor system can carry multiple items at a time. In some instances, multiple items can be carried within a certain predefined portion of the conveyor system, such as on an individual tray. At times, all of the items can be the same, or, at times, the items can be of varying size, shape, reflective properties, light absorbing characteristics, color contrast with respect to a surface of the conveyor system on which it is conveyed, etc. Moreover, an item or items can be positioned on the conveyor system at any suitable position. In various embodiments, the position of the item or items on the conveyor can be random, random in the sense that the position(s) can be the same or substantially the same as another item or items, or the position(s) can be different. For example, item positioning comparisons can be with respect to preceding or following items in the conveyor.

In various embodiments, the object or item can be relatively small. For example, the item or object can be relatively flat, such as a piece of mail in the form of an envelope. Of course embodiments of the disclosed subject matter are not limited to pieces of mail, and any suitable item, object, or article can be detected and/or its physical or spatial characteristic determined according to embodiments of the disclosed subject matter. For example, in various embodiments, the item can have a height of ½ inch or taller and/or a minimum footprint of three inches by three inches.

Thus, inspection systems, methods, and apparatuses according to embodiments of the disclosed subject matter can, generally speaking, detect presence of a relatively small item or object on a conveyance system, such as a loop sorter system that uses a tilt tray, a cross-belt, or a like mechanism to receive an item or items and carry said item or items along a conveyance path. Incidentally, the items or objects can be moved along the conveyance path at any suitable rate, such as 1.5-2.5 m/s.

Inspection systems, methods, and apparatuses according to embodiments of the disclosed subject matter can also, generally speaking, determine a characteristic of an item or items moving along the conveyance path. Item characteristics can include whether or not an item is present, a location of the item or items, a height of the item (e.g., a maximum height), whether multiple items are present, a spatial relationship between the items, and/or a geometry of the item.

Embodiments can thus detect items that are small, thin, have a light absorbing color, and/or have low color contrast to tray, for example, upon which they rest as they are conveyed along the conveyance path. Further, embodiments can perform detection so as to exclude labels stuck to the tray, avoid the need for tape/reflector, and/or be independent of environment light conditions. Further still, in embodiments, neither contrast of the item with respect to its conveyance surface nor surface characteristics of the item or conveyance surface may prevent detection and determination of a characteristic of the item, such as a height of the item.

FIG. 1 a block diagram of a system 100 according to embodiments of the disclosed subject matter. System 100 can include a controller 110, an image detecting or capturing apparatus 112, a laser source or sources 114, and a conveyor 118. Optionally, system 100 can include a triggering apparatus 116 and/or an output apparatus 120.

System 100 can be electrically connected to the components shown as indicated in FIG. 1. As shown by the dashed line, controller 110 and conveyor 118 may be optionally operatively coupled together, for example, so the controller 1110 can monitor a status (e.g., speed, stoppage, etc.) of the conveyor 118 and/or control operation of the conveyor 118 (e.g., increase speed, decrease speed, stop, start, etc.). Additional inputs, such as from sensors not explicitly shown, can also be provided to controller 110. Further, controller 110 can be any suitable controller or processor, such as an interface controller as described herein.

Image detecting or capturing apparatus 112 can be any suitable apparatus, such as a digital camera or a digital video recorder operative to function in a "camera" mode. In various embodiments, image detecting apparatus 112 can include a sensor array to sense reflected laser light output from laser source 114. The sensor array can be a complementary metal oxide semiconductor (CMOS) sensor array or a charge-coupled device (CCD) sensor array, for example. In various embodiments, the sensor array may have a pixel size such that a desired resolution (e.g., a height resolution) may be achieved in the x and/or y directions, for instance. The image detecting apparatus 112 may be part of or used with a vision tool, for instance, a computer program, that can perform pattern recognition, pixel counting, etc.

Laser source 114 can be any suitable laser source or sources and can output a laser or lasers of any suitable characteristic or characteristics. For instance, laser source 114 can be configured and operative to output a diffused laser beam or beams. The output of laser source 114 can be adjusted based on the geometry of conveyor 118, for example, and then the laser source 114 can be fixed or held at a desired orientation.

Figure 2:
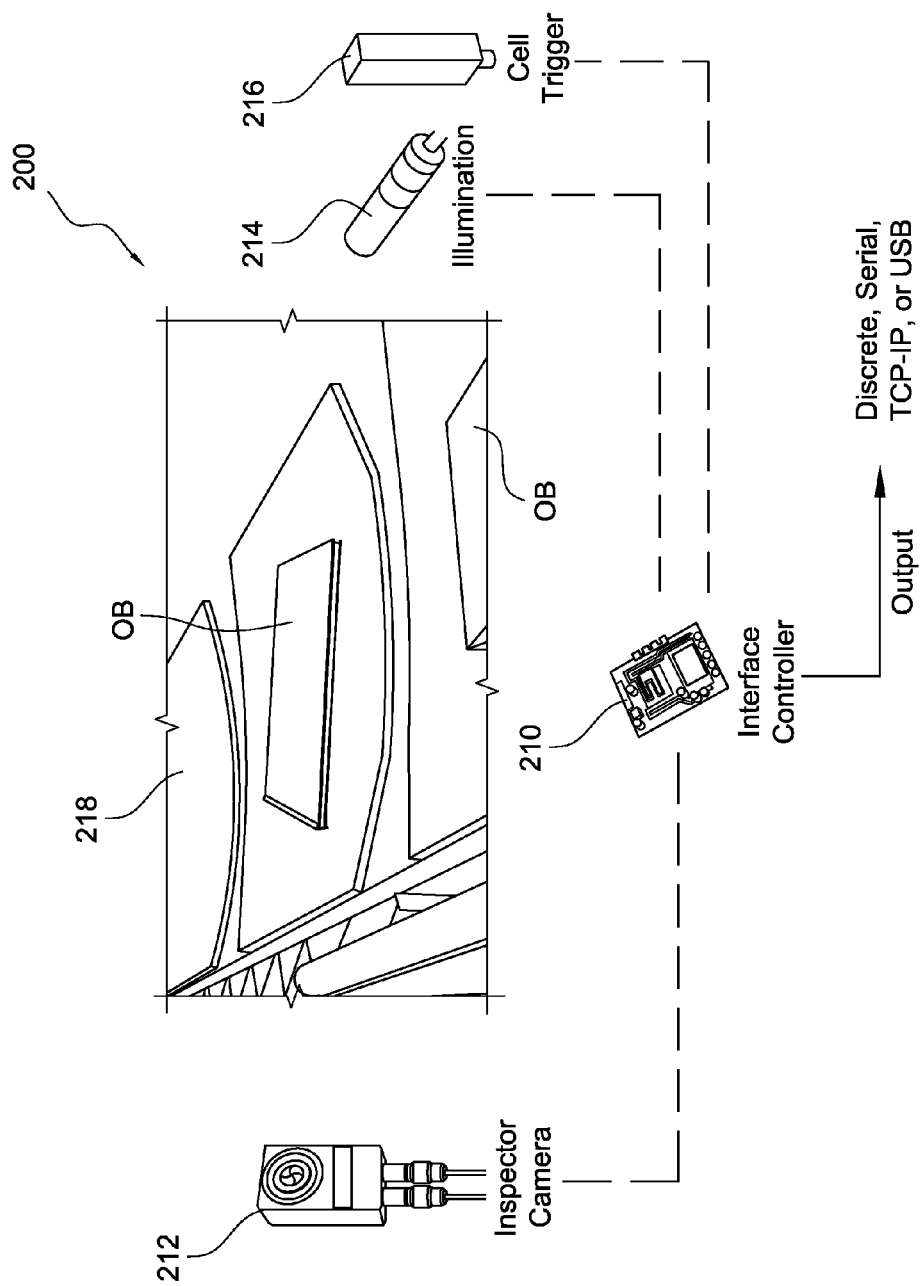
FIG. 2 shows an example of a system with specific components according to embodiments of the disclosed subject matter.
Figure 7:
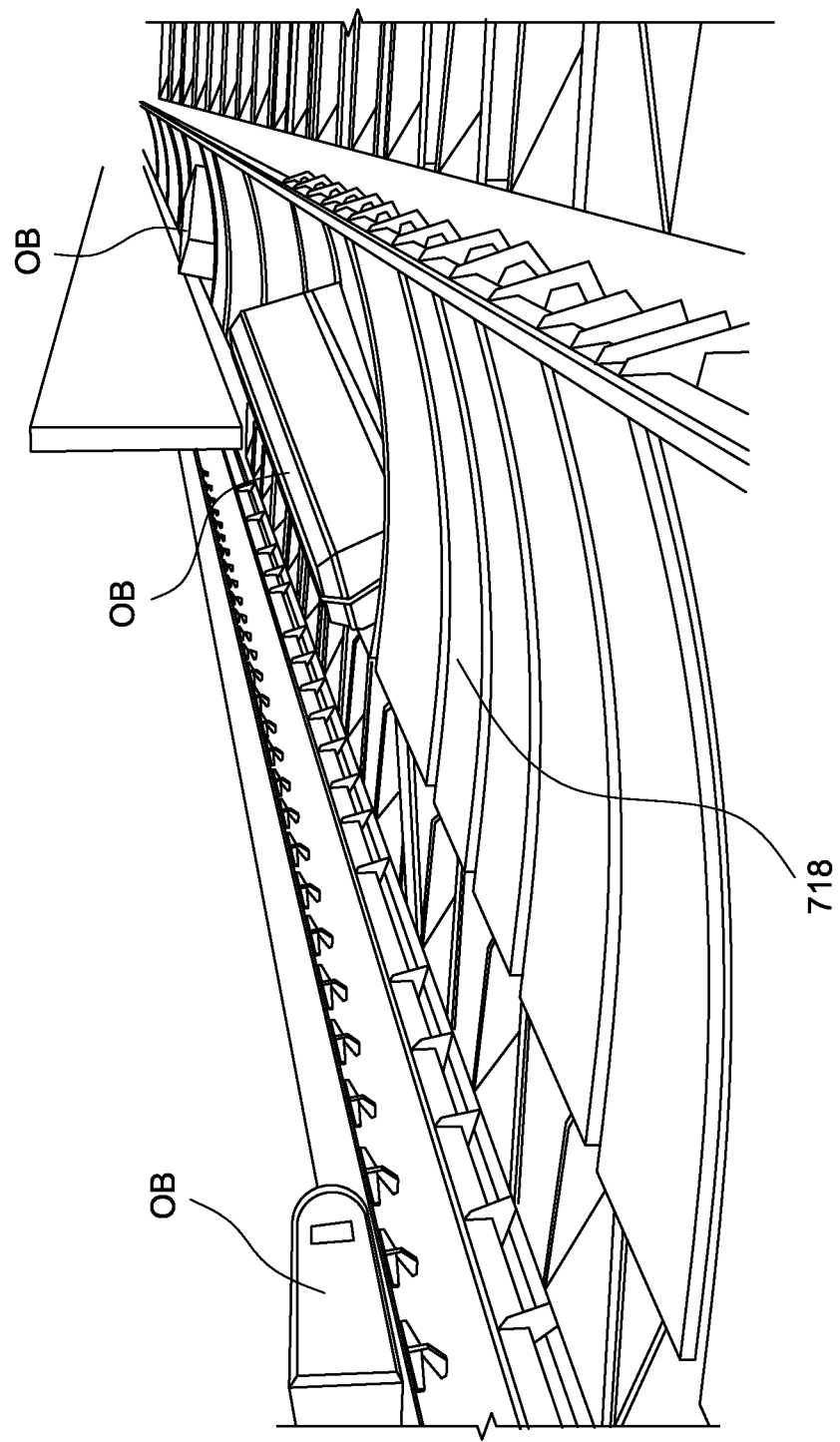
FIG. 7 shows an exemplary conveyor system implemented in embodiments of the disclosed subject matter.
Figure 8:
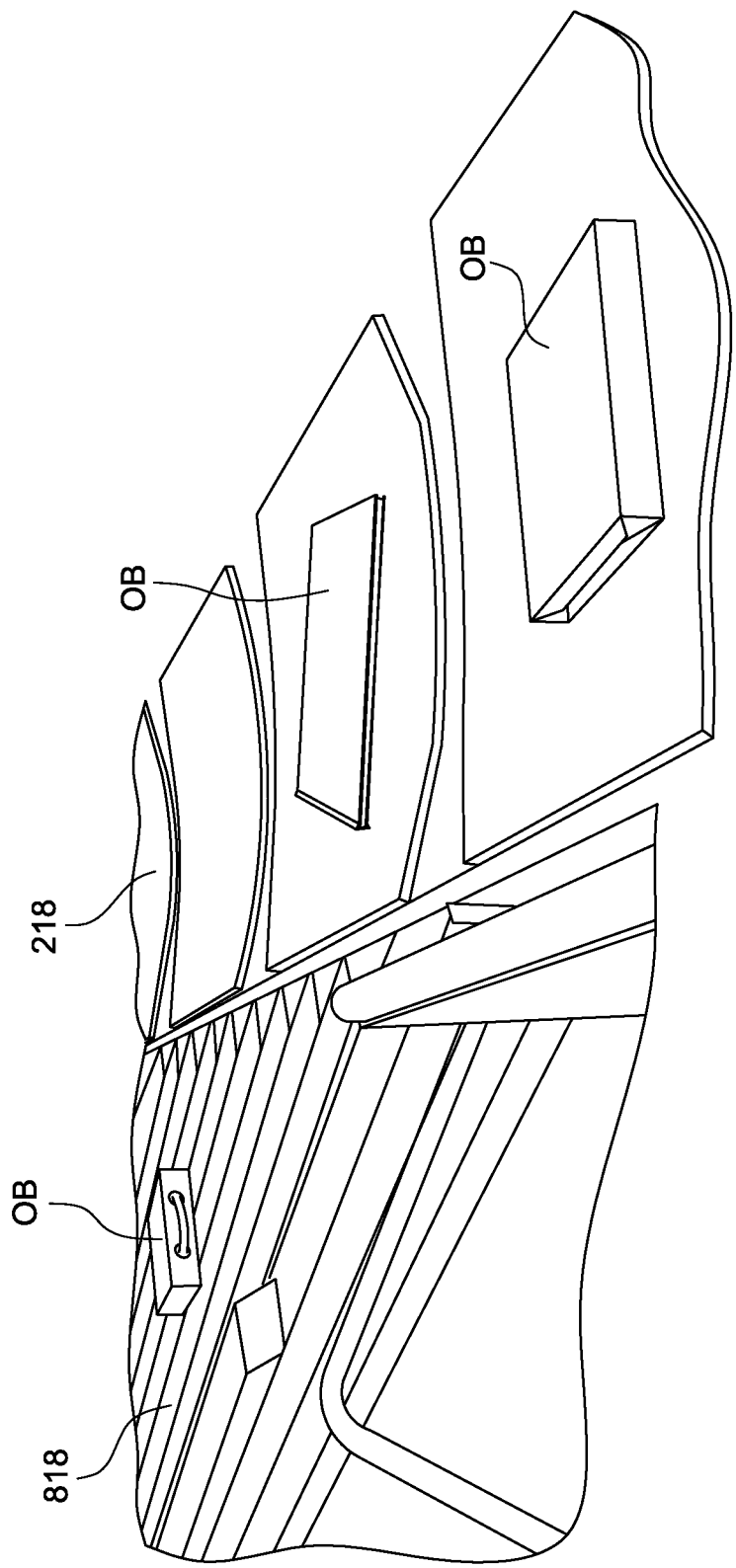
FIG. 8 is a photograph of another exemplary conveyor system implemented in embodiments of the disclosed subject matter.

Conveyor 118 can be any suitable conveyor or conveyance system as alluded to above. For example, conveyor 118 can be a loop sorter system that uses a relatively flat conveyor belt, a tilt tray, a cross-belt, or a like mechanism to receive an item or items and carry said item or items along a conveyance path. As indicated earlier, the conveyor 118 (e.g., each tray) is configured and operative to convey items of different shapes, sizes, or reflective properties. FIGS. 2, 7, and 8 show exemplary conveyor systems according to embodiments of the disclosed subject matter. Note, for example, that an upper face of the conveyor 118 may be curved (e.g., curvilinear), concave, and angled (i.e., side portions at different angles with respect to middle portion). Moreover, the bearing face of the conveyor 118 can be taut.

FIG. 2, for instance shows conveyor 218 being a plurality of trays with curved or angled, concave upper faces arranged in single-file, wherein two of the trays are shown with an individual object OB (not necessarily the same or positioned the same) being conveyed thereon. FIG. 7, for instance, shows a conveyor 718 according to embodiments of the disclosed subject matter in the form of a plurality of tilt trays with curved, concave upper faces arranged in two sets of single-file lines (which may or may not be connected), wherein several of the trays are shown with an individual object OB being conveyed thereon, while others are empty. FIG. 8 shows an expanded view of the conveyor 218 from FIG. 2. In FIG. 8, conveyor 218 receives objects OB from another conveyor 818, wherein conveyor 818 is a cross belt conveyor belt comprised of a plurality of conveyor belts, for example.

Triggering apparatus 116 can be any suitable triggering apparatus. For example, triggering apparatus 116 can be an image trigger, an electronic circuit coupled with a detection element, etc. Thus, in the case of an image trigger, in various embodiments, triggering apparatus 116 (or its function) may be implemented by image detecting apparatus 112. Output apparatus 120 can be any suitable output apparatus, such as a computer screen, a screen of a mobile device, etc. Optionally, not explicitly shown, a computer readable storage medium may be coupled to controller 110. In various embodiments, controller 110 can cause data or information from image detecting apparatus 112 and/or triggering apparatus 116 to be stored in the computer readable storage medium.

For operation, generally, image detecting apparatus 112 can be placed, in a stationary position, for example, vertically above a scan area on conveyance path of the conveyor 118. In various embodiments, the image detecting apparatus 112 can be oriented such that its detecting aperture is directed directly vertically downward. Further, in various embodiments, the image detecting apparatus 112 can be directly over a fixed scan area associated with conveyor 118 and oriented vertically downward toward said conveyor 118. Optionally, an arrangement and orientation of the image detecting apparatus 112 may be such that no hidden areas or shadow zones are created.

A diffused laser beam or beams, for example, placed at an angle, can be used to create a diagonal or curvilinear line over a target area in the conveyance path. In various embodiments, the laser source 114 may be oriented to output laser light at an angle such that the laser light is projected so as to follow or substantially follow a contour of the upper face of the conveyor 118. For example, the output laser light may follow a curved contour of the upper face of a tray of conveyor 118.

As an object resting on conveyor 118 passes through the scan zone of the image detecting apparatus 112, a height of a scan surface is changed by the object, and the projected laser line is shifted. The scan zone may be based on the contour or shape of an upper surface of the conveyor 118, such as upper surfaces of trays of the conveyor 118. Image detecting apparatus 112 can detect the laser light since it is reflected to a sensor array of the image detecting apparatus 112 and thereby sense the shift in the laser light as a change in scan plane height. Based on an amount of detected laser shift (i.e., rows of the sensor array) and the geometry of conveyor 118, for example, a determination of a characteristic of the object, such as a height of the object, can be made.

Further, in various embodiments, more than one object may rest on a portion of conveyor 118 (e.g., more than one object on a tray). The objects may be arranged in a non-touching manner, but such that portions overlap in a side view and in a non-overlapping manner from an overhead view. From a front view, portions of the objects may overlap or they may not overlap in order for the system 100 to determine physical or spatial characteristics of the objects. Thus, system 100 may be operative to determine respective physical or special characteristics of the items in the scan area based on, for example, shift characteristics of a detected shift in the laser line associated with the one of the objects and another detected shift in the laser line associated with another of the objects and so on. Shift characteristics can include a length of a break or breaks in the laser line and/or a timing of the break or breaks.

Determined object characteristics can include a presence of the object on the conveyor 118, a height of the object (as noted above), an upper profile of the object, and/or a position of the object the conveyor 118. Data associated with the determined object characteristic(s) can be stored in a computer readable medium and/or output to a display. For instance, a three-dimensional representation of the object can be calculated based on the determined object characteristic(s) and output on a display, such as the display shown in FIG. 6.

In various embodiments, image detecting apparatus 112 can take multiple image captures as the object and/or a portion of the conveyor 118 (e.g., a leading edge of a tray upon which the object rests) as the object and/or conveyor portion moves into and through the scan zone. Thus, controller 110, for example, can cause operation of the image detecting apparatus 112 in order to vary scan area lengths. In operation, controller 110 may take a trigger input from triggering apparatus 116 to determine a leading edge of an object or a leading edge of a portion of the conveyor 118, for example, and then create pulses for a desired rate of image capture. These pulses can be transmitted to the image detecting apparatus 112 to trigger an image capture or captures. When the item or portion of the conveyor 118 has passed, the triggering apparatus 116 no longer sees the item or portion of the conveyor and controller 110 can stop the pulses. Accordingly, during an entire time of intended scanning, the image detecting apparatus 112 can be triggered at a desired rate. As such, image capture for items of different lengths or conveyors of different lengths can be achieved. Thus, when rendered operational by the triggering apparatus 112, the image detecting apparatus 112 can receive and sense reflected laser light.

Image detecting apparatus 112 can be operative to selectively detect different detection fields or zones, for example, based on different areas of the scan line. For instance, in various embodiments, image detecting apparatus 112 may be programmable to create different detection fields or zones to thereby apply varying detection for different areas of scan. Such selective detection can provided for flexibility of use with differently contoured and shaped conveyor surfaces, such as tray contours, shapes, or surface. Moreover, image detecting apparatus 112 can be operative to detect an object along an entire length of the scan line (e.g., go-no go operation), or it can be set up to detect in different zones across the length of the scan line, for example, to determine a position of the object.

In various embodiments, system 100 may relocate an item on the conveyor 118 based on a detected or determined position of the object on the conveyor 118. For instance, the object may be relocated to another portion of the conveyor 118, or, alternatively, the object may be relocated completely off the conveyor 118, for example, to another conveyor or to a bin.

System 100 can be arranged in an item or object conveyance system at any suitable location. For instance, system 100 may be located at a position before induction of items to the conveyance system, at a position after unloading of items from a conveyance system, or at a position within the conveyance system. In various embodiments, the system 100 may be used to detect stray items, for example, before induction or after unloading. Further, not explicitly shown, system 100 may include a plurality of image detecting apparatuses 112, a plurality of laser sources 114, and a plurality of triggering apparatuses 116. For example, system 100 may have the foregoing plurality of components arranged at various locations in a conveyance system.

FIG. 2 shows an example of a system 200 with specific components according to embodiments of the disclosed subject matter. System 200 can include an interface controller 210 as the controller, an inspector camera 212 as the image detecting apparatus, a conveyor 218 with objects OB, an illuminator 214 as the laser source, and a cell trigger 216 as the triggering apparatus. Note also that interface controller 210 can be coupled to an output apparatus (not explicitly shown) by any suitable connection or protocol, such as discrete signals, TCP-IP, and serial signals, such as via an RS232 interface, USB, or the like. Further, the inspector camera 212 and/or interface controller 210 may be part of or used with a vision tool, for instance, a computer program, that can perform pattern recognition, pixel counting, etc. and can output data representative of the object(s) and or tray to a display device and/or to a computer readable storage medium. Also note that conveyor 218 in the system 200 is comprised of a plurality of trays having curved or angled upper surfaces upon which an object or objects OB can rest. Note, of course, that the conveyor 218 is not limited to the objects OB shown in FIG. 2 and can carry any suitable object OB.

Figure 3:
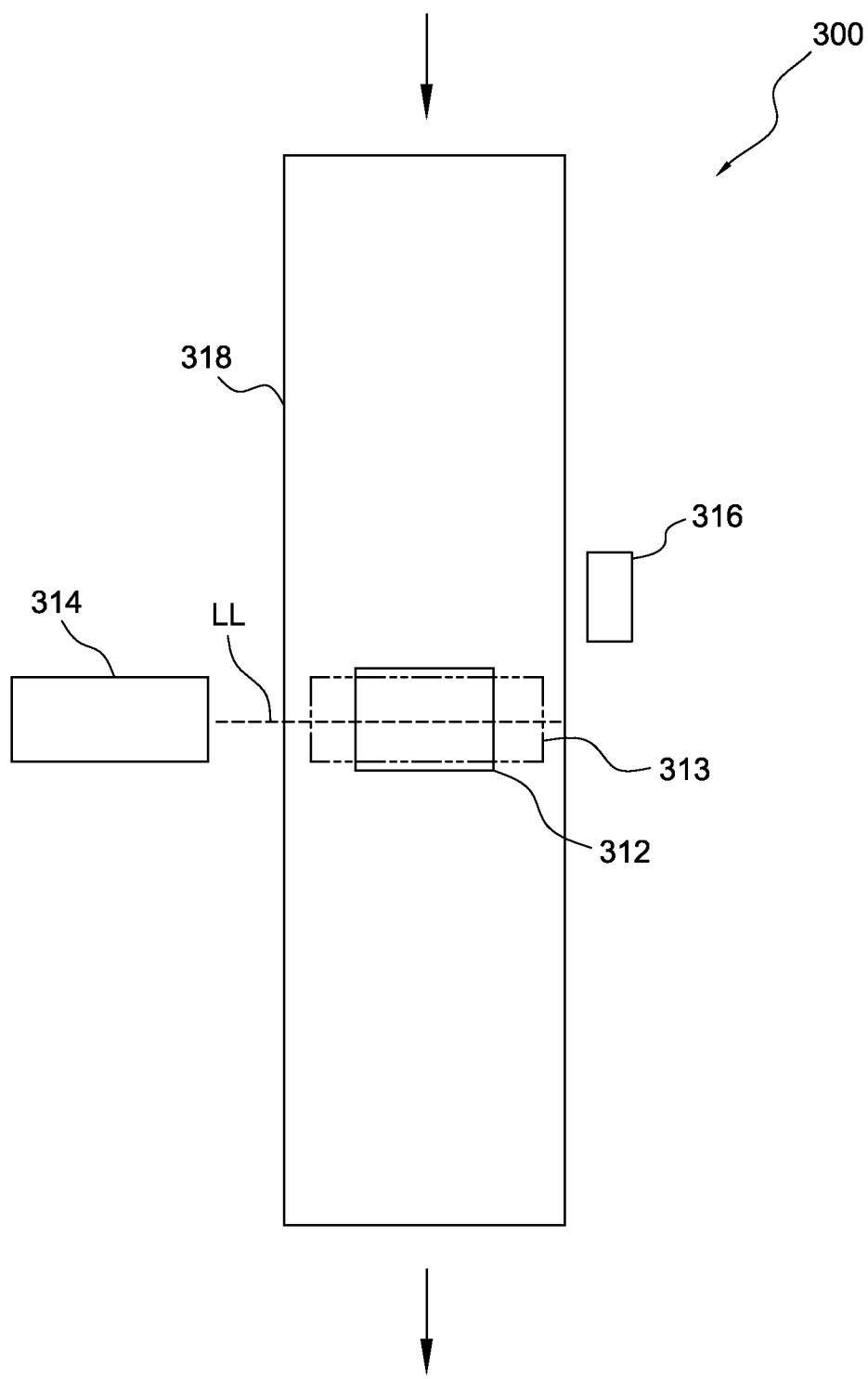
FIG. 3 is a diagrammatic representation of an overhead view of a system according to embodiments of the disclosed subject matter.

FIG. 3 is a diagrammatic representation of an overhead view of a system 300 according to embodiments of the disclosed subject matter. System 300 can include an image detecting or capturing apparatus 312, a laser source 314, a conveyor 318, and a triggering apparatus 316, all as described herein. Note that image detecting apparatus 312 is positioned directly over the conveyor 318 and in particular directly over its conveyance path (the downward going arrows indicate conveyance path). Also note that laser light LL from laser source 314 is projected across conveyor 318. FIG. 3 shows laser light being projected perpendicular to the conveyance path. However, in alternative embodiments, the laser light from laser source 314 may be projected at a non-perpendicular angle with respect to the conveyance path in plan view, for instance, in parallel fashion with respect to the conveyance path, as will be discussed in more detail below. Further, FIG. 3 shows only one laser source 314, but multiple laser sources could be implemented, on a same or different side of the conveyor 318 as the laser source 314 shown. Triggering apparatus 316 is shown as being on an opposite side of conveyor 318 as laser source 314, but triggering apparatus 316 can be at any suitable position in order to detect an object in the conveyance path and/or a portion of conveyor 318 to thereby trigger image detecting apparatus 312 operation. Item 313 indicates a scan zone of the image detecting apparatus 312. Note that item 313 is shown as a dashed line shown through the image detecting apparatus 313 so as to show the entire scan zone below the image detecting apparatus 312. As indicated above, the scan zone 313 may be modified or set prior to operation of the system 100, based on the configuration or geometry of conveyor 318.

Not expressly shown, in an alternative embodiment, another image detecting or capturing apparatus 312 may be arranged in line with apparatus 312 or offset to one side or the other of the center line of the conveyor 318. Optionally, one apparatus 312 can be positioned directly on the center line, one apparatus 312 can be positioned offset to a first side of the center line, and second apparatus 312 can be positioned offset to a second side of the center line. Additionally, optionally or alternatively, one or more additional laser sources 314 may be implemented on the same side of conveyor 318 as laser source 314 shown in FIG. 3 and/or on the opposite side of conveyor 318.

Figure 4:
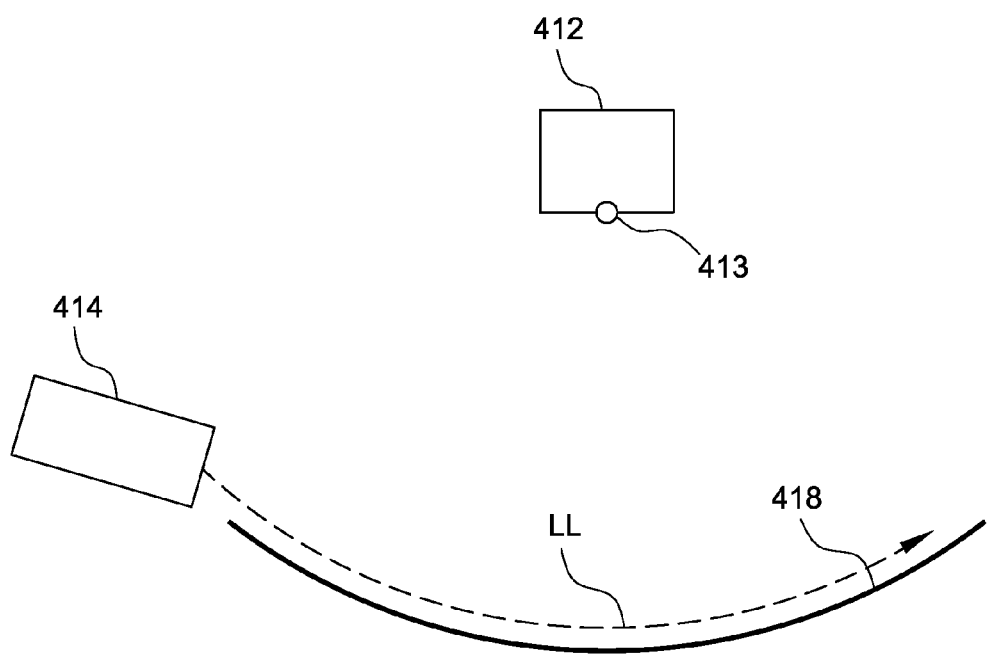
FIG. 4 is a diagrammatic operational representation of a front (or rear) view of an aspect of embodiments of the disclosed subject matter.

FIG. 4 is a diagrammatic operational representation of a front (or rear) view of an aspect of embodiments of the disclosed subject matter. Shown in FIG. 4 is a curved upper face of a conveyor 418, an image detecting apparatus 412 centered directly above the upper face of the conveyor 418, with its receiver 413 directed straight down, and a laser source 414 that projects laser light LL such that is follows (or substantially follows) the contour of the upper face of the conveyor 418.

Figure 5:
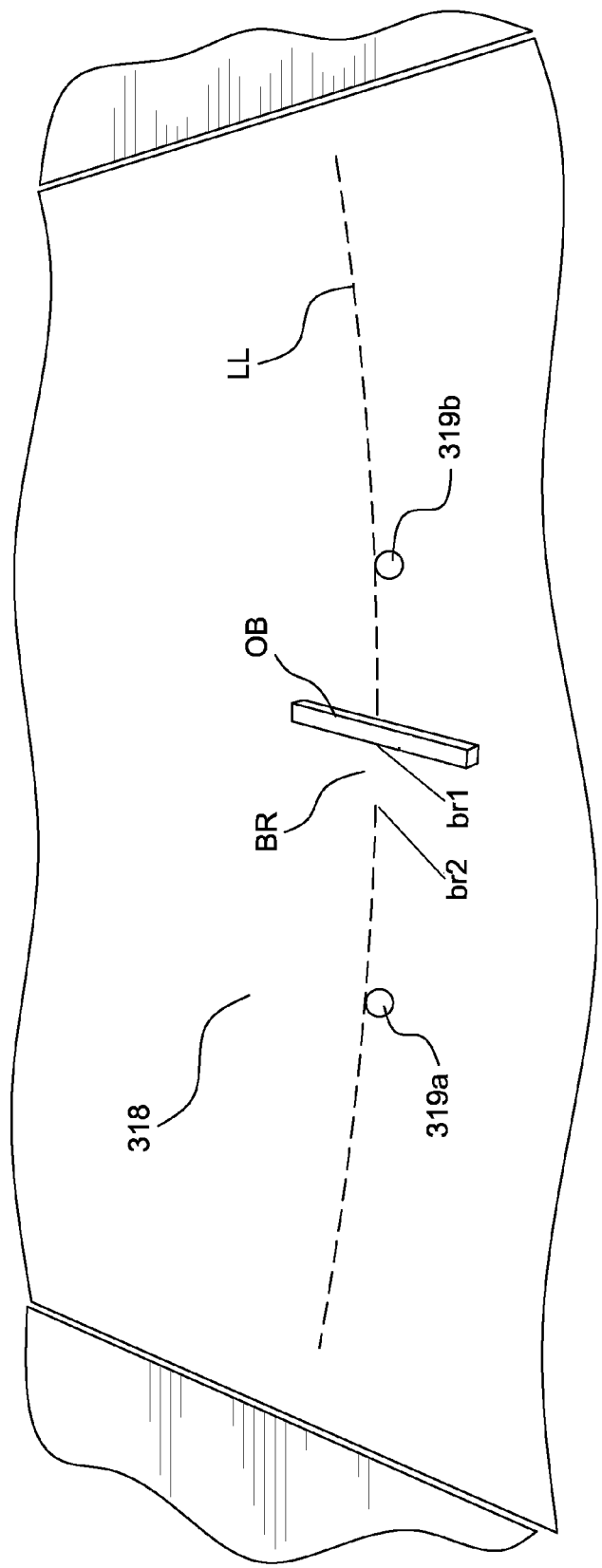
FIG. 5 shows an operational aspect of embodiments of the disclosed subject matter.

FIG. 5 is shows an operational aspect of embodiments of the disclosed subject matter.

An object OB, a pen, for instance, is moved along a conveyor 318 (e.g., with a tray), while resting on an upper surface of the conveyor 318. As the object OB crosses a laser light LL the laser line is broken or shifted at BR. An image detecting apparatus as described herein can be positioned directly overhead from the conveyance path of the conveyor and can, upon a triggering event sensed by a triggering apparatus, sense or detect the break BR in the laser line LL. Based on the length of the break (i.e., the distance between br1 and br2), for example, a physical characteristic(s) of the object OB, such as its height, can be estimated or determined. Based on the determined physical characteristic(s) of the object OB, a model representation, such as a three-dimension representation, can be generated and output on a display, for instance.

Note also that items 319a, 319b in FIG. 5 may cause breakage in the laser line LL. Such breaks are caused by retaining mechanisms, such as screws or bolts, which hold an upper part of the conveyor 318 (e.g., at tray) to a lower part (e.g., a mechanical assembly connected to a drive mechanism). As indicated above, image detecting apparatuses according to embodiments of the disclosed subject matter can be programmed to scan and thereby perform detection in specific detection zones or fields of the conveyor. Thus, in FIG. 5, the scan zone may be restricted to the area between items 319a, 319b so the image detecting apparatus only detects the break in the laser line caused by the object OB and not the breaks in the laser line caused by items 319a, 319b. In various embodiments, the scan zone can be modified in real-time as the conveyor 318 is moving. The scan zone also may be modified or adjusted for a particular contour or geometry of the conveyor's upper surface.

Figure 6:
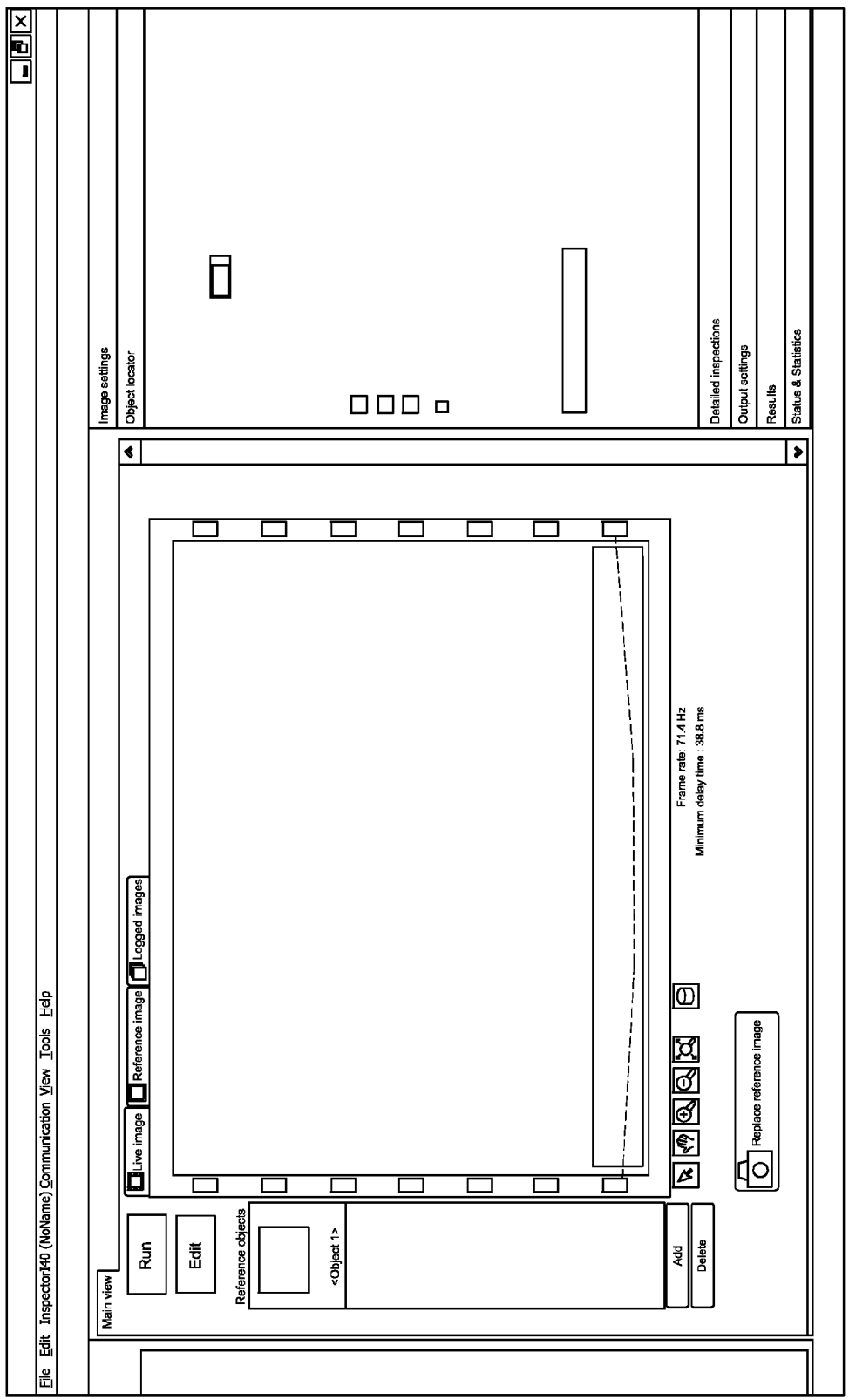
FIG. 6 shows an exemplary user interface according to embodiments of the disclosed subject matter.

FIG. 6 shows an exemplary output apparatus in the form of user interface on a computer monitor, for example. Displayed on the user interface can be data regarding the detected item or object. For instance, a three-dimensional representation can be displayed on the user interface. Profile, overhead, and positional displays of the item also can be provided by the user interface. FIG. 6, for example, shows a front or back view of the item as it rests on a tray. In various embodiments, prior to display, the data can be post processed, for example smoothed. The user interface shown in FIG. 6 also can provide for the ability to monitor live an upper surface of a conveyor as it passes through a scan line of the laser light. Additionally, real time simultaneous monitoring of multiple inspections systems can be performed via one user interface.

Figure 9:
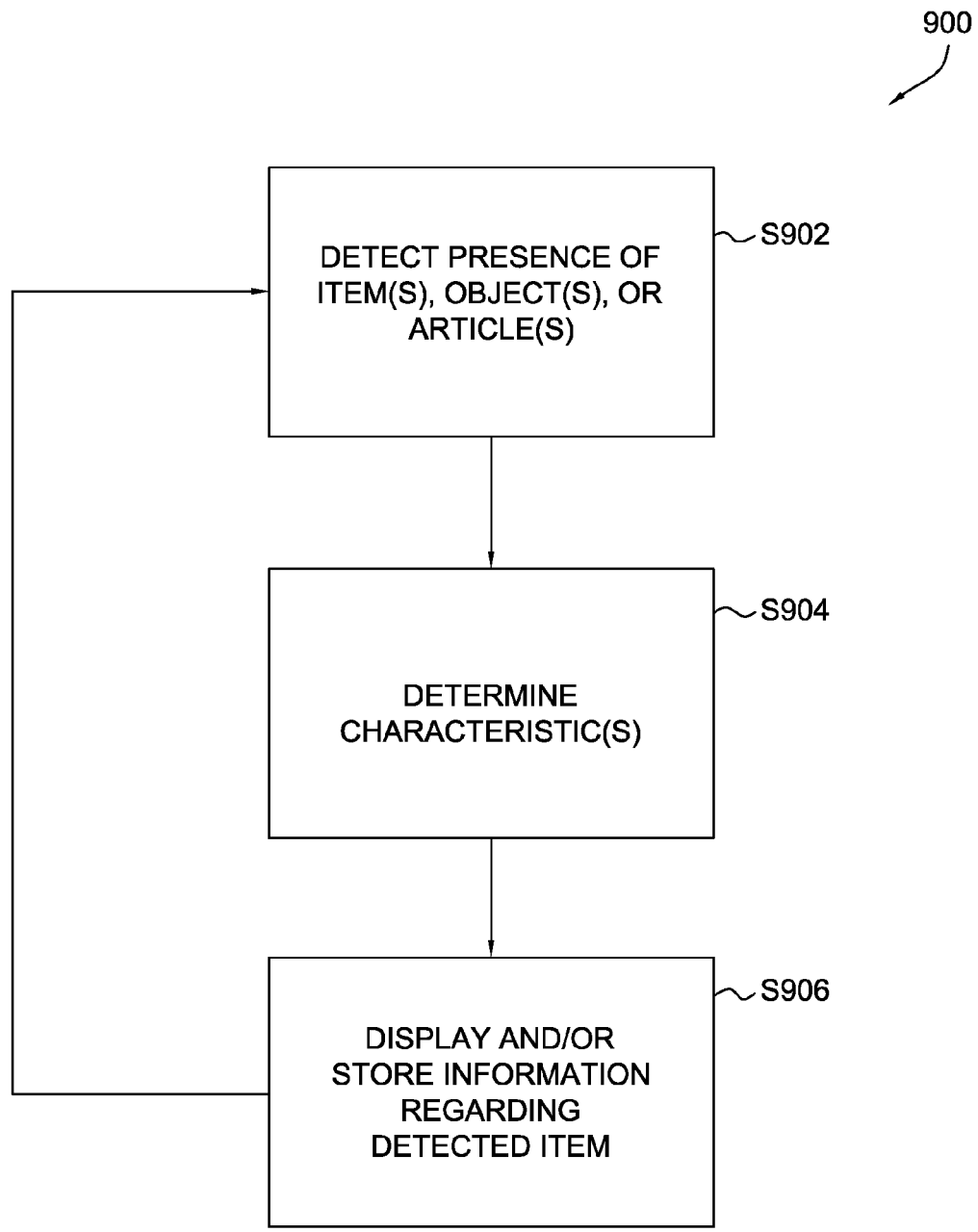
FIG. 9 is a block diagram representation of a method according to embodiments of the disclosed subject matter.

FIG. 9 is a block diagram representation of a method 900 according to embodiments of the disclosed subject matter.

Generally speaking, method 900 can include inspecting an upper surface of a conveyor (S902). Such inspection may include detecting presence of an object or objects on the upper surface of the conveyor. Optionally, a zone or a portion of a conveyor may be inspected. Optionally, such inspecting can be performed automatically and electronically, for example, based on a triggering event as described herein. Inspection can be performed using, for example, the system and components as described herein, including a controller, an image detecting apparatus, a laser source, and a triggering apparatus. Upon detection, a characteristic or characteristics of the object or objects, such as set forth herein, can be determined (S904). Optionally, such object characteristic(s) determination can be performed automatically and electronically.

Based on the determined characteristic or characteristics of the object or objects, a representation of the object(s), such as a three-dimensional representation, can be displayed, for example (S906). Optionally, data associated with the determined characteristic and/or the three-dimensional representation may be stored in a computer readable storage medium. As indicated by the arrow from S906 to S902, the method can continuously and automatically detect presence of objects traveling along a conveyance path.

Figure 10:
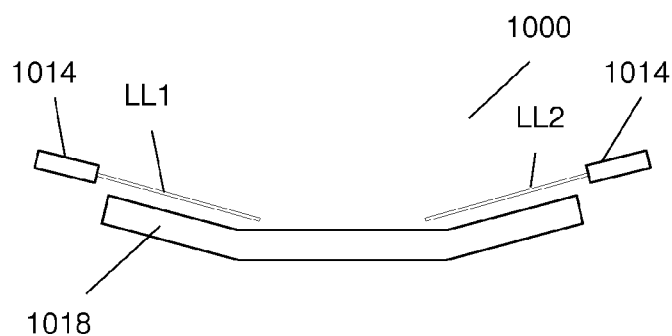
FIG. 10 is a front view of a part of a system according to one or more embodiments of the invention.
Figure 11:
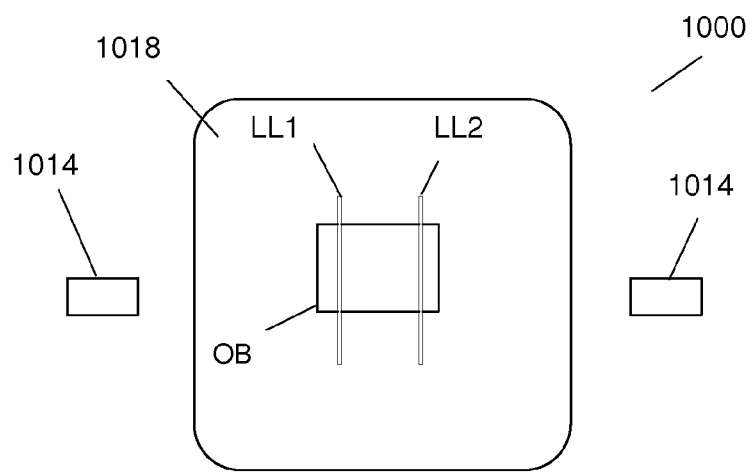
FIG. 11 is an overhead view of a part of the system shown in FIG. 10.
Figure 12:
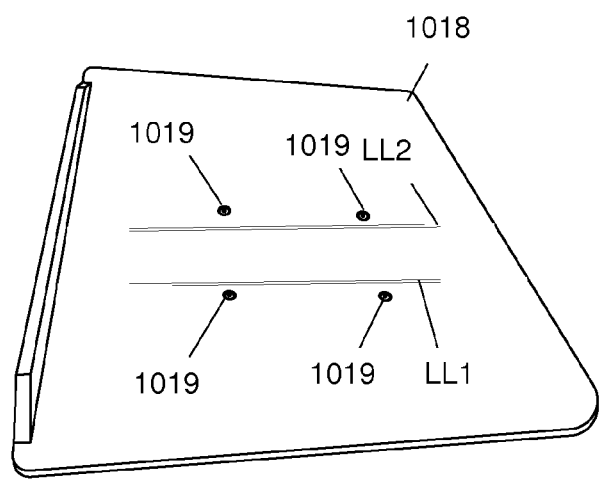
FIG. 12 is a perspective view of a part of the system shown in FIG. 10.

FIG. 10 shows a front or even cross-sectional view of a system 1000 according to one or more embodiments of the invention. FIG. 11 shows an overhead view of the system of FIG. 10. FIG. 12 shows a portion of the system of FIG. 10. Not expressly shown in FIGS. 10-12 are a controller, an image detector or sensor, and an output apparatus.

System 1000 can include two lasers 1014. Each of the lasers 1014 can be oriented such that the dispersed laser line is horizontal or substantially horizontal with a top portion or portions of the conveyor 1018. More specifically, the lasers 1014 can be mounted, one on each side of the conveyor 1018, so as to produce a projected laser line parallel or substantially parallel to a top portion of the conveyor 1018. As shown in FIG. 10, the laser lines LL1, LL2 are parallel to respective angled portions of conveyor 1018. Further, the laser lines LL1, LL2 can be dispersed such that their end portions run parallel to the direction of travel of the conveyor 1018. The direction of travel in FIG. 11 is downward. Additionally, laser lines LL1 and LL2 may have a same length or different lengths. Furthermore, optionally, the laser lines LL1, LL2 may be projected a same amount or different amounts from the sides of the conveyor 1018. As shown in FIG. 12, both of the laser lines LL1, LL2 may be projected such that they run parallel to the direction of movement of the conveyor 1018 and such that they are inside of fastening or attaching portions 1019 of the conveyor 1018.

Each of the lasers 1014 may be placed at a height above an upper surface of the conveyor 1018. Such height may be based on the minimum height of an object or objects to be detected. For instance, the lasers 1014 may be at a height less than a minimum height of a known or expected object or objects to be detected on the conveyor 1018. Optionally, due to tray wear, for instance, each of the lasers 1014 may be set at a height sufficient to minimize false detection errors as a result of a portion of the conveyor 1018 (e.g., a tray portion) blocking one or more of the laser beams from the lasers 1014.

Figure 13:
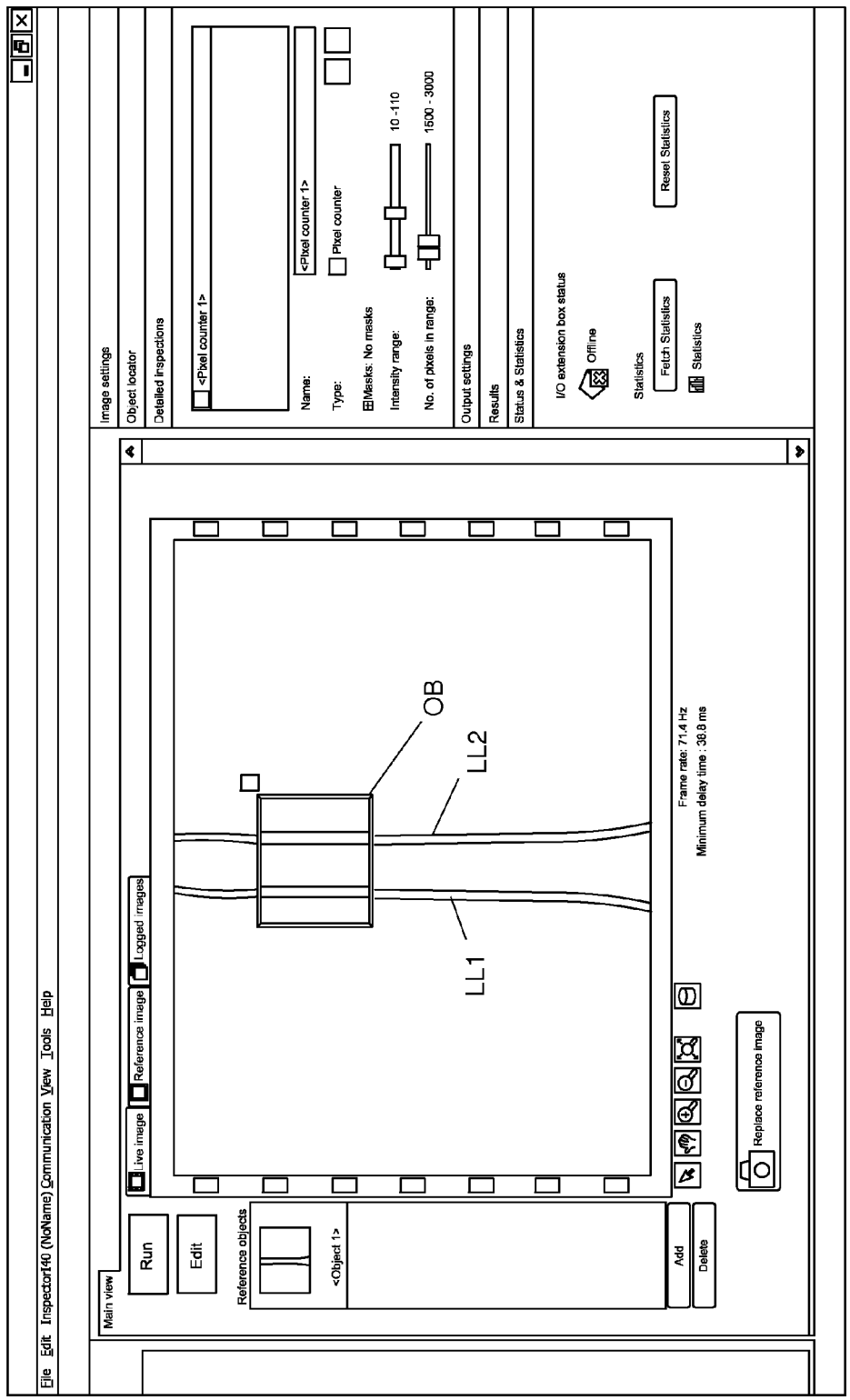
FIG. 13 is a partial screen show a user interface according to one or more embodiments of the invention.

FIG. 13 shows a partial screen shot of user interface according to one or more embodiments of the invention. The screen shot of FIG. 13 shows the display of a vision analysis tool (i.e., software product) that can be implemented with one or more embodiments of the present invention. FIG. 13 shows a display showing laser lines LL1, LL2 upon being "taught" into the vision analysis tool. The analysis tool may use pattern recognition and/or pixel counting regarding an object OB to determine one or more object characteristics, such as object height.

Thus, for system 100, an object OB may be placed on an upper surface of conveyor 1018. As the conveyor 1018 moves the object OB such that it interacts with one or more of the laser lines LL1, LL2, the object OB can create a shadow effect on one or more of the laser lines LL1, LL2. The shadow from laser occlusion can change the pattern of one or more of the laser lines LL1, LL2, which can trip or otherwise activate the vision analysis tool. Such tripping or activation can be reported or otherwise output as an indication that an object exists on the conveyor 1018 and/or information regarding one or more characteristics of the object OB, such as height, size, etc. Additionally, displacement detection can be performed with respect to the conveyor upper surface, for example. Optionally, such displacement can be mapped by displacement mapping computer graphics technique.

Although particular configurations have been discussed herein, other configurations can also be employed. It is, thus, apparent that there is provided, in accordance with the present disclosure, detection apparatuses systems, methods, and computer program products. Many alternatives, modifications, and variations are enabled by the present disclosure. Features of the disclosed embodiments can be combined, rearranged, omitted, etc., within the scope of the invention to produce additional embodiments. Furthermore, certain features may sometimes be used to advantage without a corresponding use of other features. Accordingly, Applicants intend to embrace all such alternatives, modifications, equivalents, and variations that are within the spirit and scope of the present invention.

It will be appreciated that portions (including an entire portion) of any modules, processes, methods, systems, and sections described above can be implemented in hardware, hardware programmed by software, software instructions stored on a non-transitory computer readable medium or a combination of the above. A detection system can be implemented, for example, using a processor configured to execute a sequence of programmed instructions stored on a non-transitory computer readable medium. For example, the processor can include, but not be limited to, a mobile personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, or another structured or object-oriented programming language. The sequence of programmed instructions and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, portions (including an entire portion) of any modules, processes, systems, and sections can be implemented as a single processor or as a distributed processor. Further, it should be appreciated that some or all of the steps mentioned above may be performed on a single or distributed processor (single and/or multi-core). Also, portions (including an entire portion) any processes, modules, and sub-modules described in the various figures of and for embodiments above may be distributed across multiple computers or systems or may be co-located in a single processor or system. Exemplary structural embodiment alternatives suitable for implementing the modules, sections, systems, means, or processes described herein are provided below.

Portions (including an entire portion) of any modules, processors, or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or any of their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a non-transitory computer readable medium).

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, apparatus, and computer program product can be implemented in hardware and/or software using any known or later developed systems or structures, devices and/or software by those of ordinary skill in the applicable art from the function description provided herein and with a general basic knowledge of the user interface and/or computer programming arts. Moreover, embodiments of the disclosed method, system, apparatus, and computer program product can be implemented in software executed on a programmed general purpose computer, a special purpose computer, a microprocessor, or the like.

Having now described embodiments of the disclosed subject matter, it should be apparent to those skilled in the art that the foregoing is merely illustrative and not limiting, having been presented by way of example only. Numerous modifications and other embodiments (e.g., combinations, rearrangements, etc.) are within the scope of one of ordinary skill in the art and are contemplated as falling within the scope of the disclosed subject matter and any equivalents thereto. It can be appreciated that variations to the disclosed subject matter would be readily apparent to those skilled in the art, and the disclosed subject matter is intended to include those alternatives. Further, since numerous modifications will readily occur to those skilled in the art, it is not desired to limit the disclosed subject matter to the exact construction and operation illustrated and described, and accordingly, all suitable modifications and equivalents may be resorted to, falling within the scope of the disclosed subject matter.

The invention claimed is:

1. A system for detecting a characteristic of an object riding on a portion of an upper face of a conveyor, comprising:
    an image detecting apparatus positioned directly over a path of conveyance for the conveyor, said image detecting apparatus being oriented so as to be directed directly vertically downward;
    a laser source oriented to output laser light at an angle such that the laser light is projected so as to follow or substantially follow a contour of the upper face of the conveyor; and
    a controller electrically connected to said image detecting apparatus and said laser source,
    wherein the image detecting apparatus is operative to sense a characteristic of the output laser light to detect presence of the object riding on the conveyor, wherein said laser source includes two lasers on opposite sides of the conveyor, each of the lasers being oriented so as to produce a projected laser line parallel or substantially parallel to the top surface of the conveyor and parallel to a direction of movement of the conveyor.

2. The system of claim 1, wherein the system performs displacement detection using the two laser sources.

3. The system of claim 2, wherein the displacement detection is with respect to an upper surface of the conveyor, and/or includes displacement mapping by displacement mapping computer graphics technique.

4. The system of claim 1, wherein the characteristic of the output light sensed by the image detecting apparatus includes one or more shift characteristic of the laser light, wherein the one or more shift characteristic include a combination of the length of break and timing thereof in order to determine heights of an item with a non-uniform height.

5. A method comprising:
    providing an image detecting apparatus oriented so as to be directed directly vertically downward toward a path of conveyance for a tray and a laser source oriented at an angle to project a laser so as to follow a contour of an upper face of the tray;
    automatically and electronically inspecting the upper surface of the tray for presence of an object using the image detecting apparatus in cooperation with the laser source; and
    determining whether or not an object is present on the upper face of the tray based on said inspecting of the upper surface of the tray.

6. The method of claim 5, further comprising one or both of determining a height of a detected object present on the upper face of the tray, and determining a three-dimensional representation of the detected object based on the determined height and outputting a three-dimensional image of the object.

7. A nontransitory computer readable storage medium having stored thereon software instructions that, when executed by a processor, cause the processor to perform operations comprising:
    providing signals to cause inspection by a camera of a curvilinear laser beam path on or adjacent an upper surface of a conveyor for one or more breaks in the laser path, the camera being positioned directly above and centered above the upper surface of the conveyor with respect to a direction perpendicular to a conveyance path of the conveyor; and
    determining a physical characteristic or a position of an object, whose presence was detected during the inspection by the camera, based on signals received from the camera regarding one or more breaks in the laser path.

8. The nontransitory computer readable storage medium of claim 7, wherein the physical characteristic or the position of the object includes a height of the object, a geometry of the object, a zone on the conveyor associated with the position of the object, and a length of the object, respectively.

* * * * *